United States Patent
Sinsheimer et al.

(10) Patent No.: US 10,060,475 B2
(45) Date of Patent: Aug. 28, 2018

(54) BRAKING SYSTEM

(71) Applicant: Teradyne, Inc., North Reading, MA (US)

(72) Inventors: Roger Allen Sinsheimer, Camarillo, CA (US); Gary Fowler, Newbury Park, CA (US); Vladimir Vayner, Needham, MA (US); Michael Peter Hascher, Aschau (DE); Andreas Flieher, Nussdorf (DE)

(73) Assignee: Teradyne, Inc., North Reading, MA (US)

( * ) Notice: Subject to any disclaimer, the term of this patent is extended or adjusted under 35 U.S.C. 154(b) by 610 days.

(21) Appl. No.: 14/582,648

(22) Filed: Dec. 24, 2014

(65) Prior Publication Data

US 2016/0186804 A1 Jun. 30, 2016

(51) Int. Cl.
| | | |
|---|---|---|
| *F16C 32/06* | (2006.01) | |
| *G01P 3/02* | (2006.01) | |
| *G01P 3/66* | (2006.01) | |
| *G01P 3/68* | (2006.01) | |
| *G01P 3/486* | (2006.01) | |

(52) U.S. Cl.
CPC ............ *F16C 32/0614* (2013.01); *G01P 3/02* (2013.01); *G01P 3/486* (2013.01); *G01P 3/66* (2013.01); *G01P 3/68* (2013.01)

(58) Field of Classification Search
None
See application file for complete search history.

(56) References Cited

U.S. PATENT DOCUMENTS

| | | | | |
|---|---|---|---|---|
| 4,126,093 | A * | 11/1978 | Burdick | ................... B60V 3/04 104/155 |
| 6,801,008 | B1 | 10/2004 | Jacobus et al. | |
| 7,352,198 | B2 * | 4/2008 | Nayak | ................ G01R 31/2891 324/750.22 |
| 8,035,406 | B2 | 10/2011 | Mueller | |
| 2002/0130524 | A1 | 9/2002 | McIlwraith et al. | |
| 2007/0139632 | A1 * | 6/2007 | Shiraishi | ............... G03F 7/2041 355/55 |
| 2007/0152695 | A1 | 7/2007 | Bosy et al. | |
| 2011/0174563 | A1 | 7/2011 | Riesner | |

FOREIGN PATENT DOCUMENTS

WO WO-2016/105709 A1 6/2016

OTHER PUBLICATIONS

International Preliminary Report on Patentability for PCT/US2015/061507, 17 pages (dated Jun. 27, 2017).
International Search Report for PCT/US2015/061507, 4 pages (dated Mar. 4, 2016).
Written Opinion for PCT/US2015/061507, 16 pages (dated Mar. 4, 2016).

* cited by examiner

*Primary Examiner* — Ryan A Jarrett
(74) *Attorney, Agent, or Firm* — Choate, Hall & Stewart LLP (57) ABSTRACT

An example method includes: for a component supported by an air bearing, detecting a speed of movement of the component relative to a predefined location, the air bearing generating an air flow to elevate the component relative to a ground plane; and controlling the air bearing based, at least in part, on the speed detected.

34 Claims, 5 Drawing Sheets

BRAKING SYSTEM

TECHNICAL FIELD

This specification relates generally to a safety braking system, for use, e.g., with an air bearing or other movement mechanism.

BACKGROUND

Automatic Test Equipment (ATE) refers to an automated, usually computer-driven, system for testing devices, such as semiconductors, electronic circuits, and printed circuit board assemblies. ATE typically includes large components, which may weigh on the order of tons. Examples of such components are test heads, manipulators, handlers and wafer probers. During testing, these components may need to be moved from one location to another. The most complex motion interaction is the test head as it is brought into alignment to the handler or wafer prober. The manipulator provides this articulation, typically using expensive and degree-of-freedom-limiting rail bearing sets.

SUMMARY

An example method may include: for a component supported by an air bearing, detecting a speed of movement of the component relative to a predefined location, where the air bearing generates an air flow to elevate the component relative to a ground plane and controlling the freedom of motion of the device supported by the air bearing based, at least in part, on the speed detected. The example method may include any one or more of the following features, either alone or in combination.

The example method may include: determining that the speed of movement of the component is greater than a threshold; and determining that the component is within a geographic area associated with the predefined location. Controlling the air bearing may include reducing an air flow into the air bearing so as to reduce the speed of movement of the component by removing some of the support provided by the air bearing and allowing a braking surface to contact the supporting floor. The example method may also include restricting a rate at which the air flow is reduced.

The example method may include: determining that the speed of movement of the component is less than a threshold; and determining that the component is within a geographic area associated with the predefined location. Controlling the air bearing may include maintaining an air flow of the air bearing so as to maintain the speed of movement of the component.

The example method may include: determining that the speed of movement of the component is greater than a threshold; and determining that the component is within a geographic area associated with a predefined location. Controlling the air bearing may include modulating the air flow of the air bearing so as to reduce the speed of movement of the component by allowing a braking surface to contact the supporting surface.

The example method may include: detecting the position of the component relative to the predefined location; and controlling the air bearing based also on the position. The position may be detected relative to a mat having position markers. The position markers may comprise concentric shapes having pitches that decrease at increasing distances from a center. The position markers may be detected optically. The position may be detected using radio frequency detection, where a transmitter is at the component and a receiver is at the location or where a receiver is at the component and a transmitter is at the location. The position may be detected using ultrasound. The position may be detected using tethers and potentiometers, where the tethers are connected to the component and are configured to move with the component. The lengths of the tethers corresponds to resistance measured by the potentiometers, and the position is based on the length of the tethers. The position may be detected using a global positioning system or other appropriate position location methodology.

An example system may include: a component; an air bearing supporting the component, where the air bearing is configured to generate an air flow to elevate the component relative to a ground plane; a detector to detect a speed of movement of the component on the air bearing; and a controller to output signals to control the air bearing based, at least in part, on the speed detected. The example system may include any one or more of the following features, either alone or in combination.

The controller may be configured to perform operations comprising: determining that the speed of movement of the component is greater than a threshold; and determining that the component is within a geographic area associated with the predefined location; where controlling the air bearing comprises reducing an air flow of the air bearing so as to reduce the speed of movement of the component. Controlling the air bearing may include restricting the rate at which the air flow is reduced.

The controller may be configured to perform operations comprising: determining that the speed of movement of the component is less than a threshold; and determining that the component is within a geographic area associated with the predefined location, where controlling the air bearing comprises maintaining an air flow of the air bearing so as to maintain the speed of movement of the component.

The controller may be configured to perform operations comprising: determining that the speed of movement of the component is greater than a threshold; and determining that the component is within a geographic area associated with the predefined location; where controlling the air bearing comprises reducing the air flow of the air bearing so as to reduce the speed of movement of the component.

The controller may be configured to perform operations comprising: detecting a position of the component relative to the predefined location; and controlling the air bearing based also on the position. The position may be detected relative to a mat having position markers. The position markers may include concentric shapes having pitches that decrease at increasing distances from a center. The detector may include an optical detector to detect the position markers optically. The detector may include a radio frequency detector to detect a position using radio frequency detection, where a transmitter is at the component and a receiver is at the location or where a receiver is at the component and a transmitter is at the location. The detector may include an ultrasound detector. The detector may include a tether and a potentiometer, where the tether is connected to the component and being configured to move with the component; and where a length of the tether corresponds to resistance measured by the potentiometer, the position being based on the length of the tether. The detector may include a global positioning system.

Any two or more of the features described in this specification, including in this summary section, can be combined to form implementations not specifically described herein.

The test systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The test systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Manufacturers may test devices at various stages of manufacturing. Manufacturers have an economic incentive to detect and to discard faulty components as early as possible in the manufacturing process. Accordingly, many manufacturers test integrated circuits at the wafer level, before a wafer is cut into dice. Defective circuits are marked and generally discarded prior to packaging, thus saving the cost of packaging defective dice. As a final check, many manufacturers test each finished product before it is shipped. Such a process tests parts in packages which have had additional expense added to them over bare die. So, having accurate test results reduces the need to discard valuable parts.

To test quantities of components, manufacturers commonly use ATE (or "testers"). In response to instructions in a test program set (TPS), some ATE automatically generates input signals to be applied to a device under test (DUT), and monitors output signals. The ATE compares the output signals with expected responses to determine whether the DUT is defective. ATE typically includes a computer system and a test instrument or a single device having corresponding functionalities. In some cases, the test instrument provides power to a DUT.

Some types of ATE include a test head, which may include all or part of the tester functionality. In some cases, computer system functionality may also be incorporated into the test head. In some ATE, the test head mates to a prober or handler in order to perform test procedures on a DUT. A manipulator or other device is typically used to move and to position the test head. Typically, the combined manipulator and test head are quite heavy, e.g., on the order of hundreds or even thousands of pounds. Moving the combined manipulator and test head from one location to another can therefore be difficult. For the purposes of the following description, the manipulator is assumed to hold a test head and, therefore, the combined test head and manipulator is referred to simply as "the manipulator".

To facilitate movement of the manipulator, an air bearing may be used. In some examples, an air bearing is device that generates an air flow towards a ground plane to elevate the component relative to the ground plane. Referring to test system 100 shown in FIG. 1, an air bearing 101 may be mounted to the bottom of a manipulator 103 that faces the ground plane 104. Air flow generated from the air bearing in the direction of arrow 113 forces the manipulator to lift off of the ground plane, thereby making the manipulator easier to move through application of horizontal force (roughly parallel to the ground plane along arrow 114). In some cases, the air bearing lifts the manipulator by one to five millimeters; however, the amount of lift achieved varies with the force created by the air flow.

Figure 1:
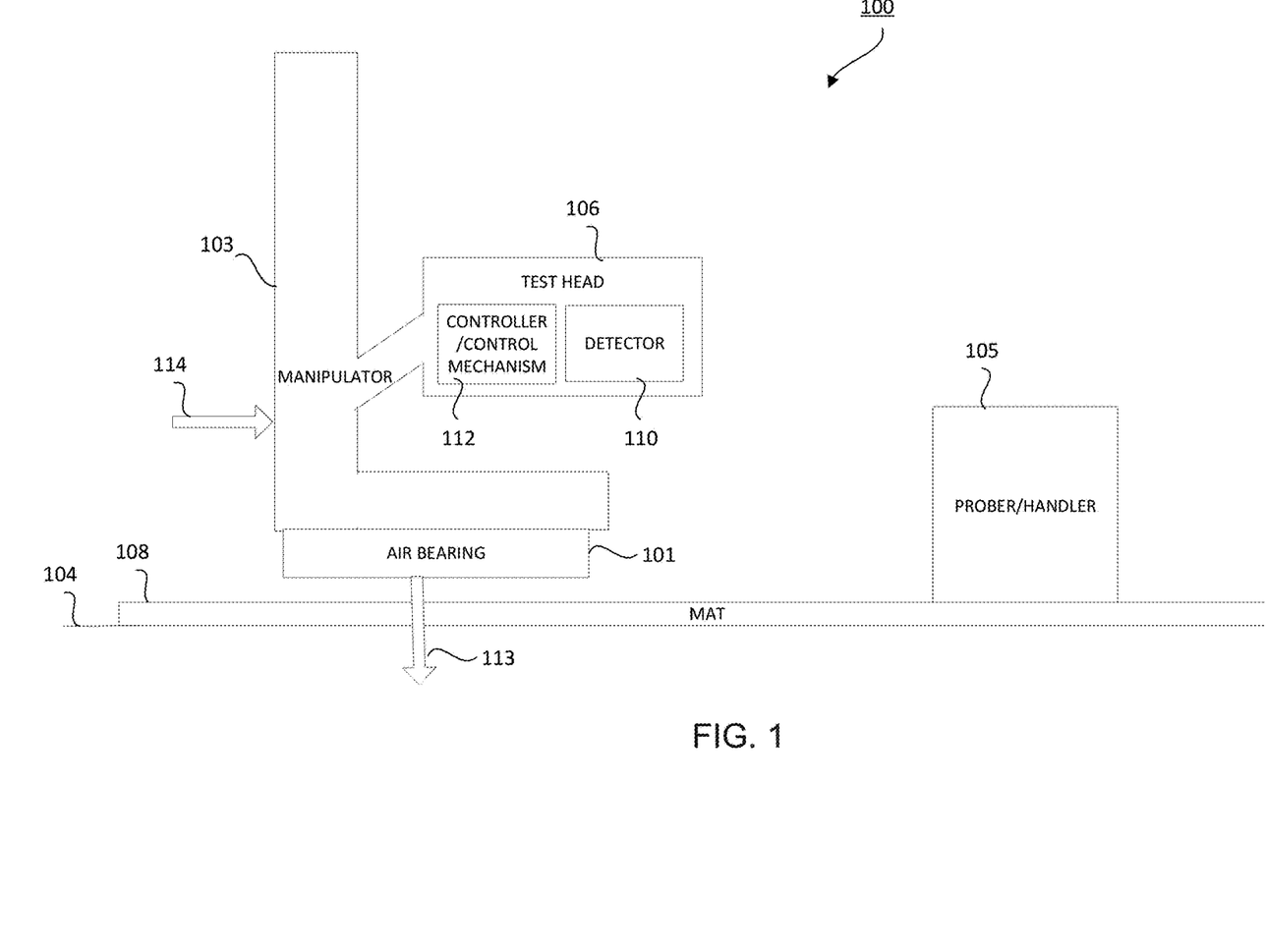
FIG. 1 is a block diagram of example automatic test equipment (ATE) that implements an air bearing and a mat-based braking system therefor.

In some cases, movement of the manipulator through use of horizontal force can create an amount of momentum that can make it difficult to stop the movement, when necessary. For example, as more force is applied, the speed of the manipulator increases, making it difficult to stop. This can be a safety hazard, given the size and weight of the manipulator and the test head it carries. Furthermore, this can cause damage to other test components, such as the prober or handler 105. For example, if the manipulator contacts the prober or handler 105 at an inappropriately high speed, the prober or handler and/or the test head and/or manipulator may be damaged.

Figure 2:
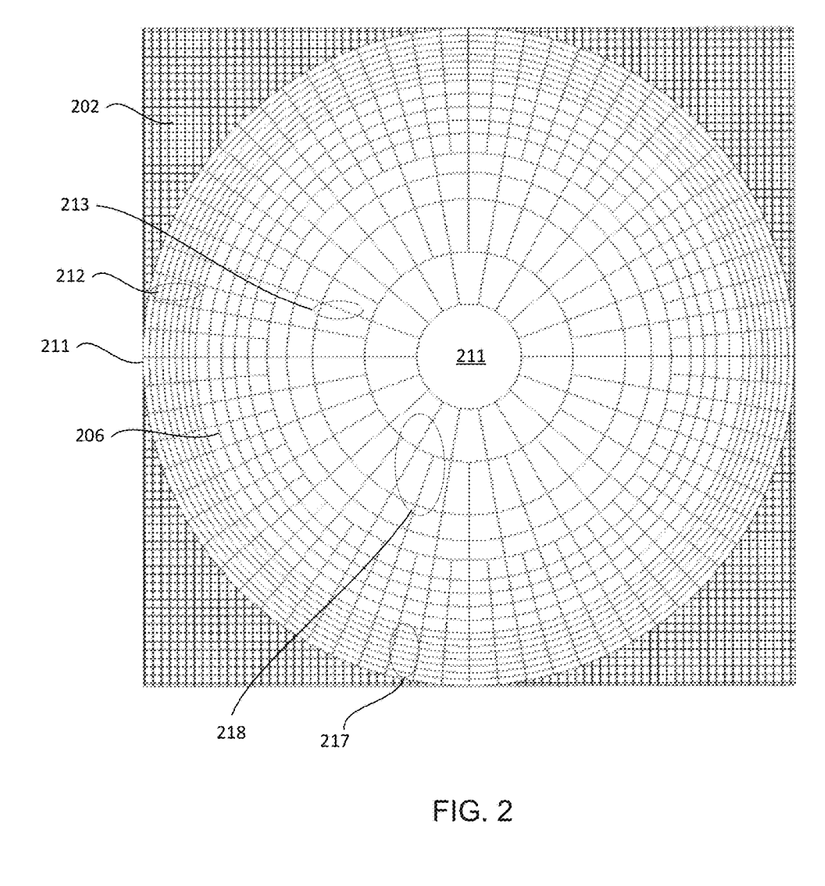
FIG. 2 is a front view of an example mat used in an air bearing braking system.

Accordingly, safety features may be incorporated into the air bearing movement system to limit the speed at which the manipulator can be moved in general or in certain areas of a test facility. In some implementations, for safety reasons, the movement system may corral or stop the manipulator. In an example implementation, a mat 108 is used in a braking system to limit the speed at which the manipulator is moved. FIG. 2 shows an example of such a mat 200; however, mats having other configurations may be used. In this example, the mat covers at least part of the test floor 202 or any other area where it is desired to limit the speed of movement of the manipulator supported by an air bearing.

As shown in FIG. 2, mat 200 includes position markers 206 (or simply, "markers"), which are detectable by a detector mechanism which, in combination with a control mechanism, (both described below) controls operation of the air bearing. As shown in FIG. 2, in this example, the pitch of the markers varies from the center 210, as does their placement. In this example, the pitch decreases further away from center 210. In this example, center 210 may be positioned at roughly the center of the test area, with the edges 211 of mat 200 positioned near to the walls or other defining features of a room containing the test area. In other examples, the mat may be placed at any appropriate location of a test floor.

In an example implementation, a detector 110 (which may, or may not, be part of a control mechanism 112) detects the pitch of markers 206 on the mat and the speed of movement of the manipulator. The detector and control mechanism may be located on the manipulator, on the test head, or on both. Signals indicative of the pitch and speed are sent from the detector to the control mechanism. The control mechanism uses those signals to control operation of the air bearing. For example, if the speed of movement is below a threshold, then the control mechanism maintains the full air flow, e.g., the amount of air (and thus the amount of force), generated by the air bearing regardless of the pitch of the markers underneath the air bearing. Thus, in this example, the air flow is maintained if the manipulator is within a geographic location defined by high-pitched markers 212 or within a geographic location defined by low-pitched markers 213 (e.g., near to the center of the mat). In this context, "high" and "low" are relative values, and are not intended to have any specific numerical connotations. In this example, the air flow is maintained and there is no change, or substantially no change in the amount of horizontal force needed to move the air bearing across the test floor. A rationale for this is that the speed of movement of the manipulator is within a safe range and, therefore, the manipulator may continue on its present course at the same speed regardless of the location of the manipulator on the test floor.

If, however, the speed of movement is at or above a first threshold, and the manipulator is in a specific geographic location (e.g., the pitch of the markers underneath the air bearing is below a second threshold), then the control mechanism changes the amount of air (and thus the amount of lifting force) generated by the air bearing. For example, in area 217, the force generated by the air less than in area 218 if the speed exceeds the first threshold. The control mechanism may restrict the air flow by controlling the size of one or more apertures used to generate the air flow, or by changing the amount or pressure of the air being introduced into the air bearing. In an example implementation, the amount of air introduced into the air bearing (and thus the amount of force generated by the air bearing) is decreased, which will make it more difficult to move the manipulator via horizontal force or may make it easier to stop it completely (since the air bearing is closer to the ground plane). A rationale for this is that the speed of movement of the manipulator is outside of a safe range and, therefore, the manipulator may need to be slowed or stopped.

In some implementations, as shown in FIG. 2, the pitch of the markers comprises concentric shapes (e.g., circles) having pitches that decrease at increasing distances from a center. In some implementations, the markers may not include concentric shapes, and the shapes may not be circular, but rather some form of quadrilateral or polygon. Generally, the markers may be arranged in any appropriate configuration and/or shape to achieve a desired level of speed control and to achieve a desired area over which speed is to be controlled. The control mechanism may likewise be programmable to achieve a desired level of speed control and to achieve a desired area over which speed is to be controlled based on the markers or any other appropriate detection mechanism.

In some implementations, the markers may be detected optically. For example, detector 110 may be an optical detector that detects the markers and their pitch using, e.g., an optical sensor, a light sensor, or any other appropriate optical detection mechanism. In some implementations, other mechanisms may be used to detect the markers and their pitch. For example, in some implementations, detector 110 may be or include thermal sensors, the markers may be heated relative to their surroundings, and the detector may detect the markers using thermal detection. In some implementations, detector 110 may be an electrical detector, the markers may contain a slight charge, and detector 110 may detect that charge. Any appropriate detector system for detecting the markers and their pitch may be used. As noted above, detector 110 sends one or more detection signals to control mechanism 112.

In some implementations, the position of the manipulator may be detected using ultrasound. For example, detector 110 may be ultrasound transducers, which may be positioned at the manipulator may be used to detect the position of the manipulator within an enclosed location (e.g., relative to a structure, such as the prober/handler, or a boundary, such as a wall). This may be done with or without the mat in place. When the transducer detects that the manipulator is at one of a number of specified locations (e.g., as the manipulator moves from a specified center location), the transducer may signal the control mechanism to limit the air flow of the air bearing to the above effect, provided that the speed of the manipulator is above a threshold, As was the case, in this example, if the speed of movement is below a threshold, then the control mechanism may maintain the air flow, e.g., the amount of air (and thus the amount of force), generated by the air bearing regardless of the location of the test head 106.

In some implementations, detector 110 may be, and/or include, a global positioning system (GPS) detector, and the position of the manipulator may be detected using GPS. This may be done with our without the mat in place. In an example, a GPS transceiver may be positioned at the manipulator and that GPS transceiver may be used to detect the position of the manipulator within an enclosed location. When the GPS transceiver detects that the manipulator is at one of a number of specified locations (e.g., as the manipulator moves from a specified center location), the GPS transceiver may signal the control mechanism to limit the air flow of the air bearing to the above effect, provided that the speed of the manipulator is above a threshold, As was the case, in this example, if the speed of movement is below a threshold, then the control mechanism may maintain the air flow, e.g., the amount of air (and thus the amount of force), generated by the air bearing regardless of the location of the test head.

Figure 3:
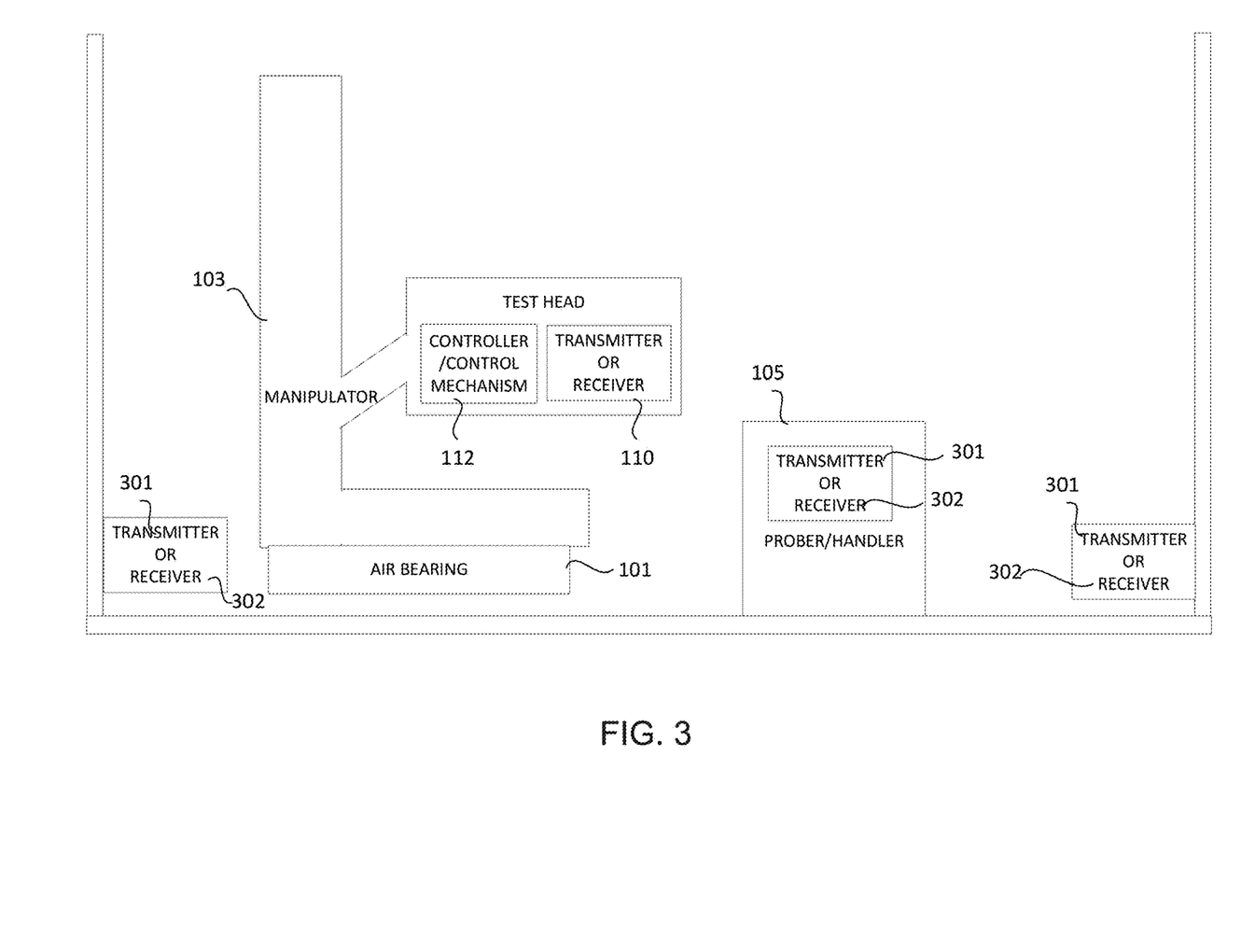
FIG. 3 is a block diagram of example ATE that implements an air bearing and a radio frequency (RF)-based braking system therefor.

In some implementations, the position of the manipulator may be detected using radio frequency detection, as shown in FIG. 3. This may be done with our without the mat in place. For example, a transmitter 301 may be positioned at the manipulator and one or more receivers 302 may be positioned outwardly from a center area where relatively unimpeded manipulator movement is permitted. As the receivers encounter signals from the transmitter indicating that the test head speed has passed a threshold and that the test head is in a specified position, the receivers may communicate with the control mechanism to control the air bearing to decrease the amount of air flow to the effect described above.

In some implementations, a receiver 305 may be positioned at the manipulator and one or more transmitters 306 may be positioned outwardly from a center area where relatively unimpeded manipulator movement is permitted. As the receiver encounters signals from the transmitters indicating that the test head speed has passed a threshold and that the test head is in a specified position, the receiver may communicate with the control mechanism to control the air bearing to decrease the amount of air flow to the effect described above. As in the example above, in this example, if the speed of movement is below a threshold, then the control mechanism may maintain the air flow, e.g., the amount of air (and thus the amount of force), generated by the air bearing regardless of the location of the test head.

Figure 4:
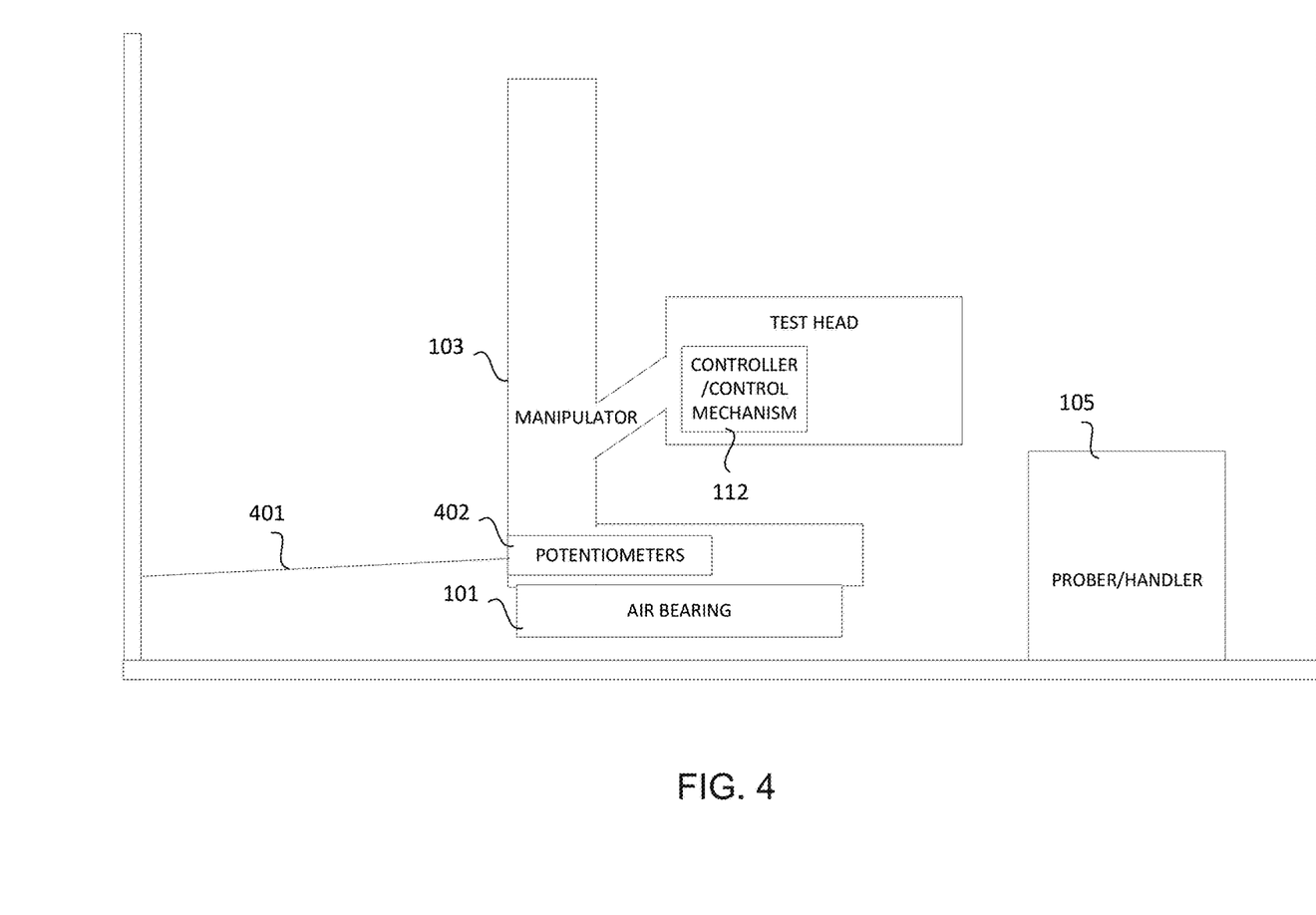
FIG. 4 is a block diagram of example ATE that implements an air bearing and a tether-based braking system therefor.
Figure 5:
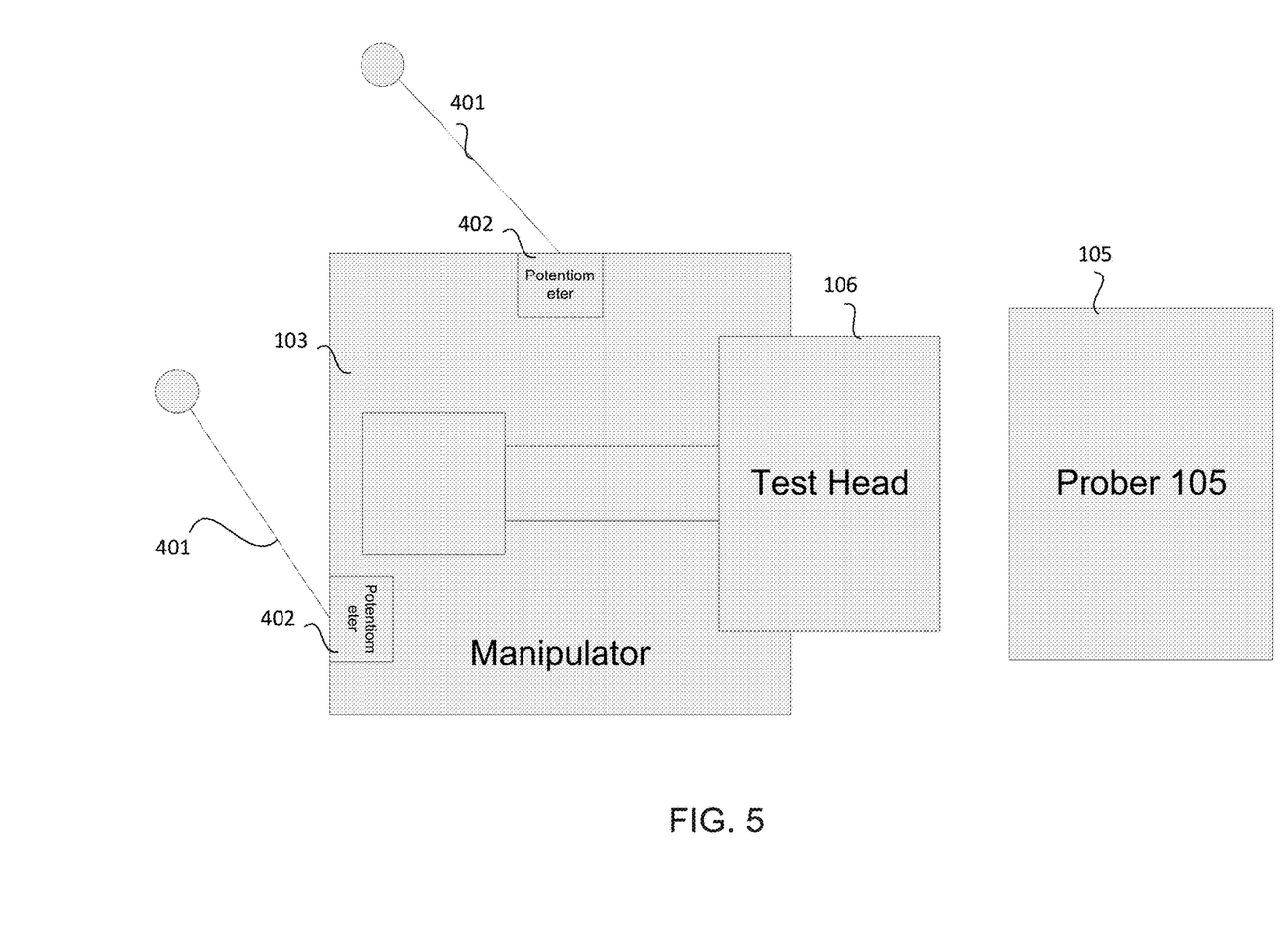
FIG. 5 is a top view of example ATE like that of FIG. 4.

Referring to FIG. 4, in some implementations, the position of the manipulator may be detected using tethers 401 and potentiometers 402. In some implementations, two potentiometers may be used to correlate the location of the manipulator. In the example of FIG. 4, tethers (one for each potentiometer) may be connected to the manipulator and may be configured to move with the manipulator. In an example, potentiometers 402 may be located at the manipulator and the corresponding tethers may be anchored to stationary point on the test floor (as shown). In another example, potentiometers 402 may be anchored to a point on the test floor, and the corresponding tethers may be connected to the manipulator (not shown). FIG. 5 shows a top view of the structure of FIG. 4, which shows example locations for the two potentiometers on the manipulator.

In any case, a length of the tether corresponds to resistance measured by the potentiometer such that the position is based on the length of the tether. Accordingly, using a computer or other appropriate processing device, it is possible to determine the resistance using the potentiometer, to determine the length of the tether using the resistance, and to determine the location of the manipulator using the lengths of the two tethers. Thus, when the computer detects that the manipulator is at one of a number of specified locations (e.g., as the manipulator moves from a specified center location), the computer may signal the control mechanism to limit the air flow of the air bearing to the above effect, provided that the speed of the manipulator is above a threshold, As was the case, in this example, if the speed of movement is below a threshold, then the control mechanism may maintain the air flow, e.g., the amount of air (and thus the amount of force), generated by the air bearing regardless of the location of the test head.

In some implementations, in any of the examples described herein, the defined areas of movement may be relative to a specified piece of equipment, such as a prober or handler. That is, the closer that the manipulator comes to the prober or handler (the location of which is known), the more that the air flow and/or pressure in the air bearing is restricted if the speed is above a certain threshold.

In some implementations, in any of the examples described herein, the amount of air flow in the air bearing may be reduced based solely on the location of the manipulator in a predefined area. That is, even if the speed is below a threshold, if the manipulator is near the edge of the area (e.g., in a tight-pitch area of the mat), then the amount of air flow in the air bearing may be reduced in order to reduce the speed of, or stop, movement of the manipulator.

In some implementations, movement of the manipulator is controlled via programmable rules, which may be executed by the control mechanism based, at least in part on detection signals from the detector, to implement the foregoing control operations. In some implementations, the rules may be non-symmetric. For example, a rule may indicate that a manipulator can only approach a prober or handler at a certain (e.g., relatively lower) speed, whereas another rule may indicate that the manipulator may move away from the prober or handler at any appropriate (e.g., relatively higher) speed, which may be constrained by one or more other rules based on safety considerations.

Any appropriate rules may be used to govern operation of movement of the test enclosure using an air bearing.

Any of the foregoing braking mechanisms, or features thereof, may be combined and/or used together, as appropriate.

Among the advantages of using an air bearing is that there is that it facilitates rotation of the manipulator on the test floor. That is, in some implementations (e.g., non-tether-based), the manipulator is not tied to any particular point that would inhibit its rotation. As a result, it may be easier to position the manipulator.

Although the examples described above are provided in the context of test equipment, the concepts described herein (e.g., use of an air bearing and control thereof according to any of the examples described herein) is not limited to the testing context, and may be used in any appropriate context to move any appropriate equipment across any appropriate surface.

While this specification describes example implementations related to "testing" and a "test system," the devices and method described herein may be used in any appropriate system, and are not limited to test systems or to the example test systems described herein.

The example control mechanism and/or detector may be implemented using hardware or a combination of hardware and software. For example, a test system like the ones described herein may include various controllers and/or processing devices located at various points. A central computer may coordinate operation among the various controllers or processing devices. The central computer, controllers, and processing devices may execute various software routines to effect control and coordination of the control mechanism.

The air bearing can be controlled (e.g., by the control mechanism), at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the control mechanism and braking described herein can be performed by one or more programmable processors executing one or more computer programs to perform the functions described herein. All or part of the control mechanism and air braking described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" as used herein may imply a direct physical connection or a connection that includes intervening components but that nevertheless allows electrical signals (including wireless signals) to flow between connected components. Any "connection" involving electrical circuitry mentioned herein, unless stated otherwise, is an electrical connection and not necessarily a direct physical connection regardless of whether the word "electrical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method comprising:
   for a component supported by an air bearing, detecting a speed of movement of the component relative to a predefined location, the air bearing generating an air flow to elevate the component relative to a ground plane;
   determining that the speed of movement of the component is greater than a threshold;
   determining that the component is within a geographic area associated with the predefined location; and
   controlling the air bearing based, at least in part, on the speed detected, wherein controlling the air bearing comprises reducing an air flow of the air bearing so as to reduce the speed of movement of the component.

2. The method of claim 1, further comprising restricting a rate at which the air flow is reduced.

3. A method comprising:
   for a component supported by an air bearing, detecting a speed of movement of the component relative to a predefined location, the air bearing generating an air flow to elevate the component relative to a ground plane;
   determining that the speed of movement of the component is less than a threshold;
   determining that the component is within a geographic area associated with the predefined location; and
   controlling the air bearing based, at least in part, on the speed detected, wherein controlling the air bearing comprises maintaining an air flow of the air bearing so as to maintain the speed of movement of the component.

4. A method comprising:
   for a component supported by an air bearing, detecting a speed of movement of the component relative to a predefined location, the air bearing generating an air flow to elevate the component relative to a ground plane;
   determining that the speed of movement of the component is greater than a threshold; and
   determining that the component is within a geographic area associated with the predefined location; and
   controlling the air bearing based, at least in part, on the speed detected, wherein controlling the air bearing comprises maintaining an air flow of the air bearing so as to maintain the speed of movement of the component.

5. A method comprising:
   for a component supported by an air bearing, detecting a speed of movement of the component relative to a predefined location, the air bearing generating an air flow to elevate the component relative to a ground plane;
   detecting a position of the component relative to the predefined location; and
   controlling the air bearing based the speed detected and on the position;
   wherein the position is detected relative to a mat having position markers.

6. The method of claim 5, wherein the position markers comprise concentric shapes having pitches that decrease at increasing distances from a center.

7. The method of claim 5, wherein the position markers are detected optically.

8. The method of claim 5, wherein the position is detected using radio frequency detection, where a transmitter is at the component and a receiver is at the predefined location, or where the receiver is at the component and the transmitter is at the predefined location.

9. The method of claim 5, wherein the position is detected using ultrasound.

10. The method of claim 5, wherein the position is detected using a tether and a potentiometer, or tethers and potentiometers, the tether or tethers being connected to the component and being configured to move with the component; and
    wherein a length of the tether corresponds to resistance measured by the potentiometer, the position being based on the length of the tether, or wherein lengths of the tethers correspond to resistances measured by the potentiometers, the position being based on the lengths of the tethers.

11. The method of claim 5, wherein the position is detected using a global positioning system.

12. The method of claim 1, 3, 4, or 5, wherein the component comprises a manipulator for holding a test head.

13. The method of claim 1, 3, 4, or 5, wherein the component comprises a combined test head and manipulator.

14. The method of claim 1, 3, or 4, wherein determining that the component is within the geographic area is performed using radio frequency detection, where a transmitter is at the component and a receiver is at a predefined location, or where the receiver is at the component and the transmitter is at the predefined location.

15. The method of claim 1, 3, or 4, wherein determining that the component is within the geographic area is performed using ultrasound.

16. The method of claim 1, 3, or 4, wherein determining that the component is within the geographic area is performed using a tether and a potentiometer, or tethers and potentiometers, the tether or tethers being connected to the component and being configured to move with the component; and
    wherein a length of the tether corresponds to resistance measured by the potentiometer, the position being based on the length of the tether, or wherein lengths of the tethers correspond to resistances measured by the potentiometers, the position being based on the lengths of the tethers.

17. The method of claim 1, 3, or 4, wherein determining that the component is within the geographic area is performed using a global positioning system.

18. A system comprising:
a component;
an air bearing to support the component, the air bearing being configured to generate an air flow to elevate the component relative to a ground plane;
a detector to detect a speed of movement of the component on the air bearing; and
a controller to output signals for controlling the air bearing based, at least in part, on the speed detected;
wherein the controller is configured to perform operations comprising:
   determining that the speed of movement of the component is greater than a threshold; and
   determining that the component is within a geographic area;
   wherein controlling the air bearing comprises reducing an air flow of the air bearing so as to reduce the speed of movement of the component.

19. The system of claim 18, wherein controlling the air bearing comprises restricting a rate at which the air flow is reduced.

20. A system comprising:
a component;
an air bearing to support the component, the air bearing being configured to generate an air flow to elevate the component relative to a ground plane;
a detector to detect a speed of movement of the component on the air bearing; and
a controller to output signals for controlling the air bearing based, at least in part, on the speed detected;
wherein the controller is configured to perform operations comprising:
   determining that the speed of movement of the component is less than a threshold; and
   determining that the component is within a geographic area;
   wherein controlling the air bearing comprises modulating air flow of the air bearing so as to reduce the speed of movement of the component by allowing a braking surface to contact a supporting surface of the air bearing.

21. A system comprising:
a component;
an air bearing to support the component, the air bearing being configured to generate an air flow to elevate the component relative to a ground plane;
a detector to detect a speed of movement of the component on the air bearing; and
a controller to output signals for controlling the air bearing based, at least in part, on the speed detected;
wherein the controller is configured to perform operations comprising:
   determining that the speed of movement of the component is greater than a threshold; and
   determining that the component is within a geographic area;
   wherein controlling the air bearing comprises modulating air flow of the air bearing so as to reduce the speed of movement of the component by allowing a braking surface to contact a supporting surface of the air bearing.

22. A system comprising:
a component;
an air bearing to support the component, the air bearing being configured to generate an air flow to elevate the component relative to a ground plane;
a detector to detect a speed of movement of the component on the air bearing; and
a controller to output signals for controlling the air bearing based, at least in part, on the speed detected;
wherein the controller is configured to perform operations comprising:
   detecting a position of the component relative to a predefined location; and
   controlling the air bearing based also on the position;
   wherein the position is detected relative to a mat having position markers.

23. The system of claim 22, wherein the position markers comprise concentric shapes having pitches that decrease at increasing distances from a center.

24. The system of claim 22, wherein the detector comprises an optical detector to detect the position markers optically.

25. The system of claim 22, wherein the detector comprises a radio frequency detector to detect the position using radio frequency detection, where a transmitter is at the component and a receiver is at the predefined location, or where the receiver is at the component and the transmitter is at the predefined location.

26. The system of claim 22, wherein the detector comprises an ultrasound detector.

27. The system of claim 22, wherein the detector comprises a tether and a potentiometer, or tethers and potentiometers, the tether or tethers being connected to the component and being configured to move with the component; and
   wherein a length of the tether corresponds to resistance measured by the potentiometer, the position being based on the length of the tether, or wherein lengths of the tethers correspond to resistances measured by the potentiometers, the position being based on the lengths of the tethers.

28. The system of claim 22, wherein the detector comprises a global positioning system.

29. The system of claim 18, 20, 21, or 23, wherein the component comprises a manipulator for holding a test head.

30. The system of claim 18, 20, 21, or 23, wherein the component comprises a combined test head and manipulator.

31. The system of claim 18, 20, or 21, wherein determining that the component is within the geographic area is performed based on radio frequency detection, where a transmitter is at the component and a receiver is at a predefined location, or where the receiver is at the component and the transmitter is at the predefined location.

32. The system of claim 18, 20, or 21, wherein determining that the component is within the geographic area is performed based on ultrasound.

33. The system of claim 18, 20, or 21, wherein determining that the component is within the geographic area is performed based on a tether and a potentiometer, or tethers and potentiometers, the tether or tethers being connected to the component and being configured to move with the component; and
   wherein a length of the tether corresponds to resistance measured by the potentiometer, the position being based on the length of the tether, or wherein lengths of the tethers correspond to resistances measured by the potentiometers, the position being based on the lengths of the tethers.

34. The system of claim 18, 20, or 21, wherein determining that the component is within the geographic area is performed based on a global positioning system.

* * * * *

UNITED STATES PATENT AND TRADEMARK OFFICE
CERTIFICATE OF CORRECTION

PATENT NO. : 10,060,475 B2
APPLICATION NO. : 14/582648
DATED : August 28, 2018
INVENTOR(S) : Roger Allen Sinsheimer et al.

Page 1 of 1

It is certified that error appears in the above-identified patent and that said Letters Patent is hereby corrected as shown below:

In the Claims

In Column 12, Line 41, in Claim 29, delete "or 23," and insert -- or 22, --, therefor.

In Column 12, Line 43, in Claim 30, delete "or 23," and insert -- or 22, --, therefor.

Signed and Sealed this
Twenty-ninth Day of January, 2019

Andrei Iancu
*Director of the United States Patent and Trademark Office*